UNITED STATES PATENT OFFICE.

EDWARD G. SCHAUMBERG AND VICTOR C. DILLMANN, OF ST. LOUIS, MO.

PRESERVING FRUIT-JUICES.

SPECIFICATION forming part of Letters Patent No. 237,449, dated February 8, 1881.

Application filed March 10, 1880. (Specimens.)

*To all whom it may concern:*

Be it known that we, EDWARD G. SCHAUMBERG and VICTOR C. DILLMANN, of the city and county of St. Louis, State of Missouri, have invented a new and useful Process of Preserving Fruit-Juices; and we do hereby declare that the following is a full, clear, and exact description of the invention, which will enable others skilled in the art to which it appertains to make and use the same.

Our invention consists in a novel process of preserving fruit-juices by sealing and heating the same without contact with the external air.

Heretofore various articles have been preserved by inclosing in air-tight vessels and submitting them to a boiling-heat before finally closing the same; but the flavor of many substances is deteriorated by a high temperature, and it is our object to provide an efficient means for preserving the juices of fruits without submitting them to such injurious temperature. To accomplish this we put the fruit-juice into bottles, which are immediately corked and wired securely, and then submerged in a vat or water-bath to a depth of about one inch above the bottles, and the temperature of the water raised to 170° Fahrenheit, (76.6° centigrade.) The bottles are allowed to remain in the water-bath at that temperature thirty-five (35) minutes, and are then removed. The advantage of this process is, that the fruit-juices will remain sweet indefinitely, will not ferment, and are free from all foreign substances, drugs, or other deleterious compounds which are so often used for a similar purpose. When juices from grapes or apples are preserved by our process it is impossible to distinguish them from new wine or cider just pressed from the fruit.

We are aware that by Appert's process fruits and their juices have been inclosed in bottles and boiled therein to preserve; but in so doing the bottles and contents are boiled and the substances consequently injured. In our process the heat is kept below 170° Fahrenheit, (76.6° centigrade,) and the juices are therefore kept in their natural condition.

Having fully described our invention, what we desire to claim and secure by Letters Patent is—

The process of preserving fruit-juices herein set forth, consisting in bottling and sealing the said juices, and in then heating the bottles and their contents to 170° Fahrenheit (76.6° centigrade) for thirty-five minutes, substantially as set forth.

ED. G. SCHAUMBERG.
    VICTOR C. DILLMANN.

Witnesses:
 FRED J. DIETERICH,
 JACOB GEORGE JÜNGST.